No. 822,051. PATENTED MAY 29, 1906.
G. A. JONES.
MILK PAIL.
APPLICATION FILED OCT. 11, 1905.
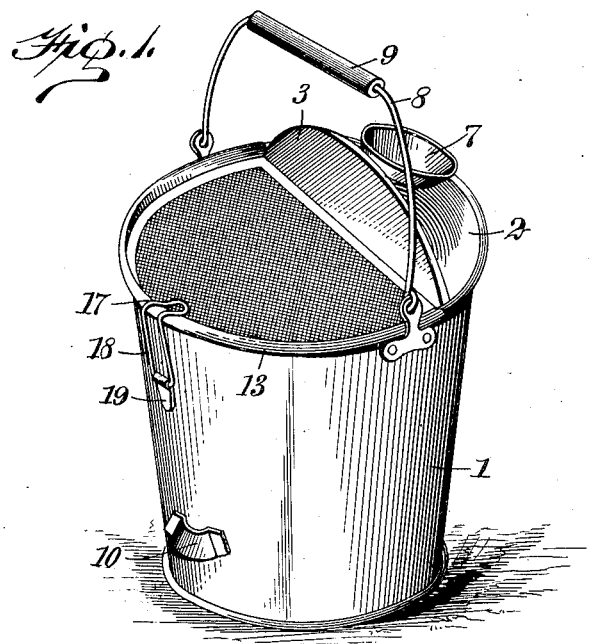
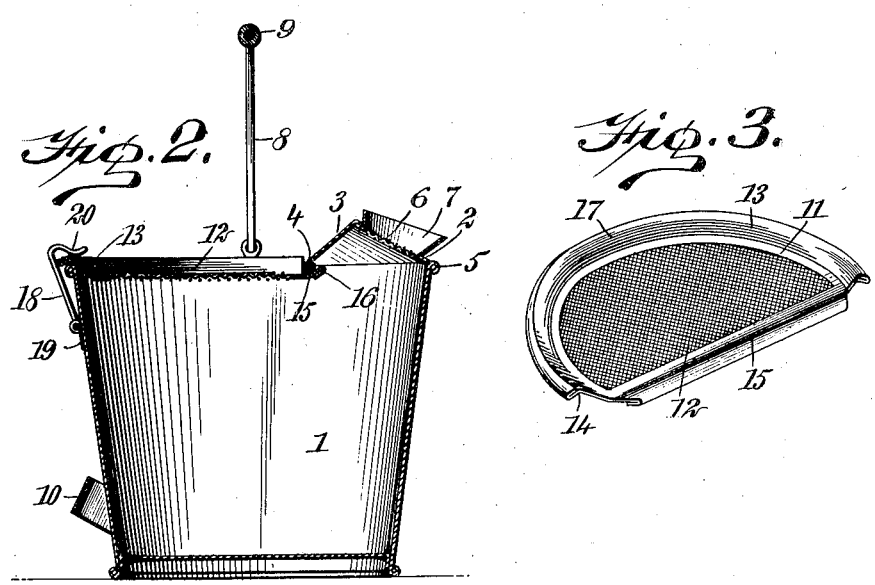
WITNESSES:
INVENTOR
George A. Jones
BY
ATTORNEYS

UNITED STATES PATENT OFFICE.

GEORGE A. JONES, OF OTTAWA, KANSAS.

MILK-PAIL.

No. 822,051.　　　　　Specification of Letters Patent.　　　　　Patented May 29, 1906.

Application filed October 11, 1905. Serial No. 282,271.

*To all whom it may concern:*

Be it known that I, GEORGE A. JONES, a citizen of the United States, and a resident of Ottawa, in the county of Franklin and State of Kansas, have invented a new and Improved Milk-Pail, of which the following is a full, clear, and exact description.

This invention relates to milk-pails, such as used on farms when milking.

The object of the invention is to produce a milk-pail having a strainer attachment which will substantially close the mouth of the pail and protect the milk from falling dirt or insects.

A further object is to provide an arrangement which will enable the strainer to be readily removed or replaced.

The invention consists in the construction and combination of parts to be more fully described hereinafter and definitely set forth in the claims.

Reference is to be had to the accompanying drawings, forming a part of this specification, in which similar characters of reference indicate corresponding parts in all the figures.

Figure 1 is a perspective of a milk-pail embodying my invention. Fig. 2 is a vertical central section in a plane passing in a front and rear direction; and Fig. 3 is a perspective of my strainer attachment, representing the same as removed from the pail.

Referring more particularly to the parts, 1 represents the body of the pail, which is of any suitable form, such as that shown. The upper edge of this body 1 has rigidly attached thereto on one side a crown-plate or cowl 2 of the usual curved form, said crown-plate being formed at its rear side with an inclined rearwardly-projecting flange 3. The lower edge 4 of this flange is substantially on a line with the upper edge 5 of the body of the pail and extends transversely of the body at a point not far removed from the center thereof, as shown.

As usual in pails of this general class, the crown-plate 2 is provided with an opening closed by a gauze strainer 6, adjacent to which an outwardly-projecting spout 7 is formed, as indicated.

The bucket is provided with a bail 8 of common form, having a handle 9 at the usual point. The rear side of the bucket-body is provided with a clip or handle 10, which facilitates the pouring of the milk through the strainer 6 and through the spout 7.

I provide means for covering that portion of the opening of the bucket which is not closed by the crown-plate 2. For this purpose I provide a strainer 11. (Shown most clearly in Fig. 3.) This strainer has a body 12 formed of wire-gauze and having substantially the form of a segment of a circle. This body 12 is attached to a rim-section 13 of circular form, which conforms in curvature to the upper edge of the bucket, as will be readily understood. This rim is preferably formed of light sheet metal bent slightly downwardly toward its outer edge, so as to present a rudimentary groove or channel 14 on its under side. The straight forward edge of the gauze 12 is attached to a transverse cleat 15, which is preferably formed integrally with the rim 13 and bent at its forward edge so as to present an upwardly-turned lip 16, as indicated most clearly in Fig. 2. The rim 13 and cleat 15 together constitute a frame adapted to be removably applied to the bucket, and said frame is preferably formed of light sheet metal bent to the form described.

In applying the strainer 11 to the bucket the rim 13, at a point such as the point 17, will be held elevated, so as to enable the lip 16 to be thrust under the edge 4 of the flange 3, whereupon the strainer will be forced forwardly and downwardly in such a way as to seat the rim 13 under the edge or lip 5 of the bucket-body. In doing so it should be understood that the edge 5 will be received in the aforesaid rudimentary channel or groove 14.

Preferably at a point substantially opposite the point 17 referred to above the body of the bucket is provided near its upper edge with a fastener or catch 18, the same preferably being formed of wire attached by means of a hinge-plate 19, so as to be rotatable upon a horizontal axis and in a plane at right angles to the edge of the bucket near the point at which the catch is attached. The upper portion of this catch is bent forwardly, so as to form a bill 20, and this bill when the catch is forced forwardly, as indicated in Fig. 2, engages with the upper side of the rim 13 and holds the strainer in position, as will be readily understood. This catch 18 is preferably constructed of resilient wire. Evidently it may be readily applied or operated, so as to release the strainer when the same is to be removed.

In using the pail the strainer 11 is preferably put in position for the milking operation, so that the milk in passing into the pail goes through the strainer-body 12. In this way the contents of the pail is protected even during the milking operation, and it will also be evident that the milk will be strained twice—first in passing through the strainer 11 and later passing through the strainer 6 when the milk is poured from the pail into crocks or similar receptacles.

A pail constructed with a cowl and provided with a strainer, such as the strainer 11, is considered more substantial and less liable to injury than a construction in which the strainer covers the entire pail.

Having thus described my invention, I claim as new and desire to secure by Letters Patent—

1. A milk-pail having a body presenting a projecting edge and a removable strainer having a lip adapted to project under said edge to retain the same, said strainer having a rim adapted to seat on the edge of said body, and means for retaining said rim.

2. A milk-pail having a body presenting a transversely-disposed edge, a strainer having a lip adapted to be thrust under said edge and presenting a rim seating on the edge of said body, and a catch attached to said body opposite said transverse edge and adapted to engage said rim to retain said strainer.

3. A milk-pail having a body with a cowl presenting an edge in substantial alinement with the edge of said body and extending transversely thereof, and a strainer having a lip at its forward edge received under said cowl, said strainer having a rim seating upon the edge of said body, and means for retaining said rim upon said body at a point removed from said cowl.

In testimony whereof I have signed my name to this specification in the presence of two subscribing witnesses.

GEORGE A. JONES.

Witnesses:
GEO. D. MITCHELL,
W. J. COSTIGAN.